United States Patent [19]

Puppin

[11] Patent Number: 5,435,866
[45] Date of Patent: Jul. 25, 1995

[54] METHOD AND APPARATUS FOR REPAIRING LAMINATED MATERIAL OR CRACKED MATERIAL

[75] Inventor: Giuseppe Puppin, Bayport, Minn.

[73] Assignee: Andersen Corporation, Bayport, Minn.

[21] Appl. No.: 163,586

[22] Filed: Dec. 7, 1993

Related U.S. Application Data

[63] Continuation of Ser. No. 645,052, Jan. 24, 1991, abandoned.

[51] Int. Cl.$^6$ .............................................. B32B 35/00
[52] U.S. Cl. ...................................... 156/94; 52/514; 156/98; 264/36
[58] Field of Search .................. 156/94, 98; 264/36; 52/514, 207; 29/402.01, 402.09, 402.18

[56] References Cited

U.S. PATENT DOCUMENTS

| | | | |
|---|---|---|---|
| 2,458,032 | 1/1949 | Simon et al. | 156/94 |
| 3,202,732 | 8/1965 | Braun et al. | 264/36 |
| 3,211,813 | 10/1965 | Behrendt | 264/36 |
| 3,804,685 | 4/1974 | Jacoby et al. | 156/98 |
| 4,086,113 | 4/1978 | Cataffo et al. | 156/98 |
| 4,208,456 | 6/1980 | Holmes | 156/94 |
| 4,479,331 | 10/1984 | Bertolami et al. | 52/204 |
| 4,510,001 | 4/1985 | Spees | 156/98 |
| 4,528,150 | 7/1985 | Charlebois et al. | 264/36 |
| 4,622,085 | 11/1986 | Yamada et al. | 264/36 |
| 4,652,319 | 3/1987 | Hammond | 156/94 |
| 4,780,162 | 10/1988 | Forler et al. | 264/36 |

Primary Examiner—Michael W. Ball
Assistant Examiner—Daniel J. Stemmer
Attorney, Agent, or Firm—Merchant, Gould, Smith, Edell, Welter & Schmidt

[57] ABSTRACT

A method and apparatus for repairing laminated material or cracked material includes preheated molds (30 and 130) which have cavities (34 and 134) shaped to generally conform to a given shape of a workpiece (20). Clamps (40, 41 and 42) apply pressure to the molds, and thereby the workpiece. In a preferred embodiment, the mold (30) has an auxiliary cavity (35). Adhesive may be injected into the mold cavity (134) to repair a delaminated workpiece and a patch adhesive to the mold cavity (34) to repair a crack.

4 Claims, 4 Drawing Sheets

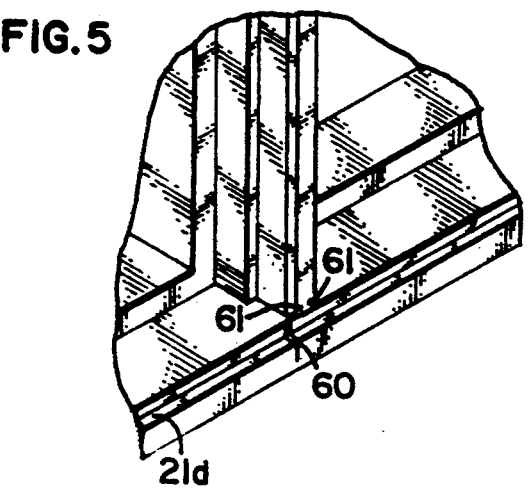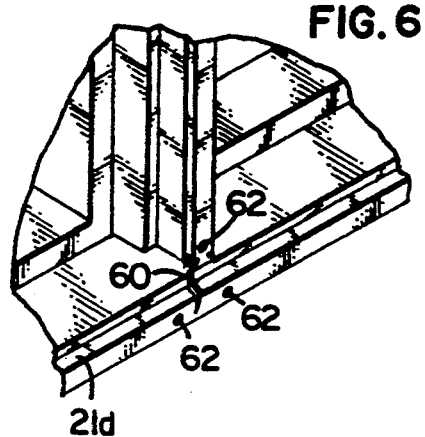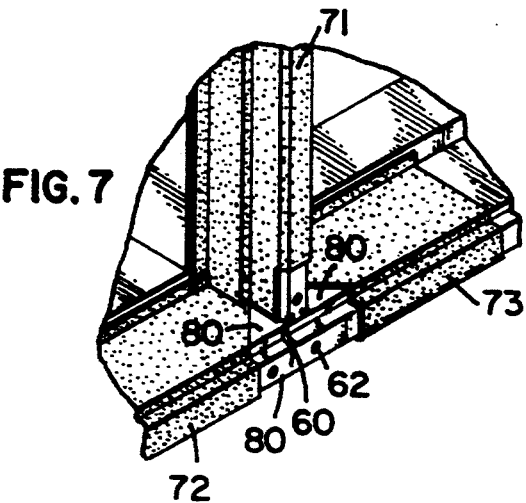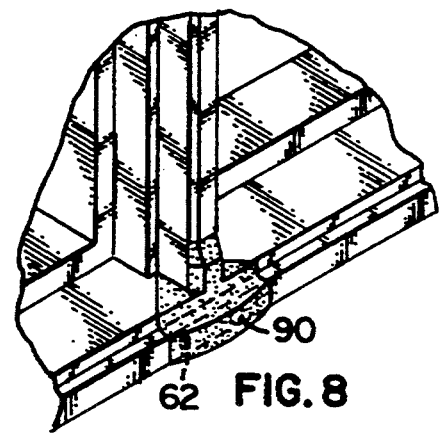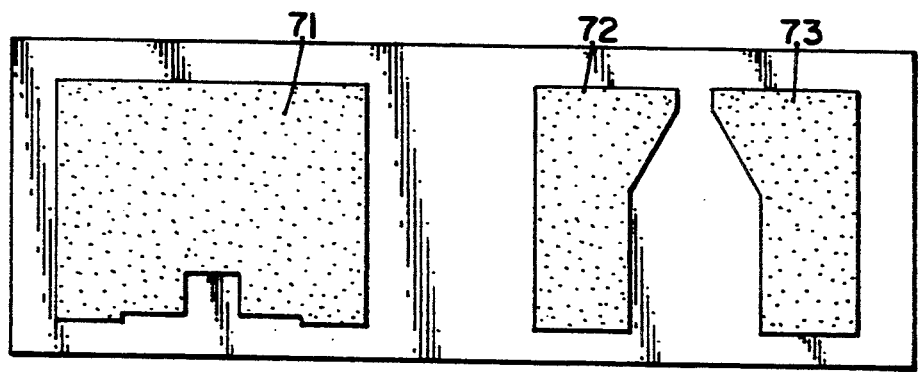

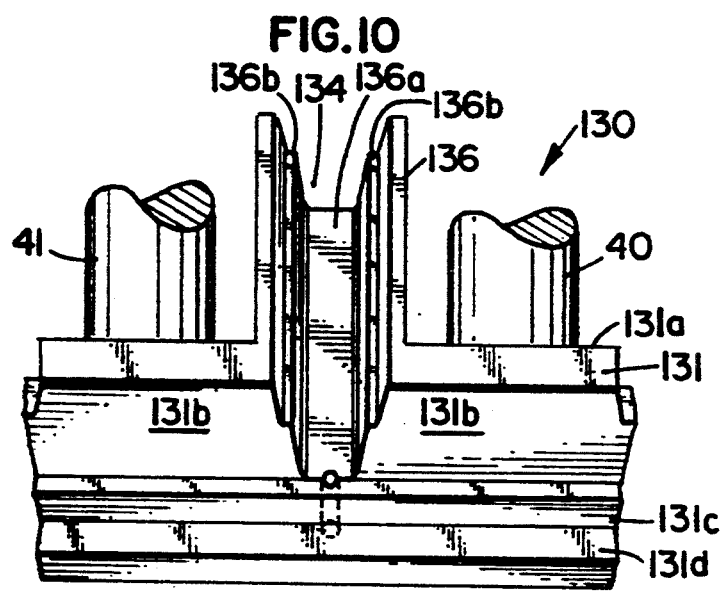

METHOD AND APPARATUS FOR REPAIRING LAMINATED MATERIAL OR CRACKED MATERIAL

This is a continuation of prior application Ser. No. 07/645,052, filed on Jan. 24, 1991, entitled METHOD AND APPARATUS FOR REPAIRING LAMINATED MATERIAL OR CRACKED MATERIAL, now abandoned.

BACKGROUND OF THE INVENTION

1. Field of the Invention

This invention relates generally to a method and apparatus for repairing laminated material or cracked material, and more particularly to a method and apparatus for repairing laminated material which has delaminated and/or cracked material with the use of a mold.

2. Description of the Prior Art

The present invention addresses two problems which are common in making repairs. The first is repairing a component which has a crack and the second is repairing a component which comprises two laminated materials. Two methods which have been used in the past to repair both cracks and separations are patching and recovering. With patching a similar material to the object being repaired, is placed over the affected area and adhered by suitable means such as an adhesive. Alternately, the entire unit, and not just the portion which needs repair, may be entirely recovered.

Typically, the first approach is less than a desirable way of adequately repairing and the second approach is very expensive.

The repair process becomes even more difficult when the repaired structure has an irregular or shaped surface. This irregular surface makes the repair even more difficult. These problems are even more evident when making repairs in the field. For instance, a window may have its laminates separate and a crack develop. The repairs should be done at the building because removal of the window is too costly and inefficient. There is a need for an efficient and effective method for repairing windows, as well as other objects.

The present invention provides for an improved method and apparatus for repairing cracked material, as well as separated, laminated material.

SUMMARY OF THE INVENTION

The present invention is an apparatus for repairing a workpiece, the workpiece having a given shape. The apparatus includes a mold having a cavity which is shaped to generally conform to the given shape of the workpiece. A means for heating the mold is provided as well as a means for applying pressure to the mold, so that the pressure is transmitted from the mold to the workpiece. In a preferred embodiment, the mold defines a passageway into an auxiliary cavity.

The present invention is also a method for repairing a laminated workpiece, the workpiece having a first material laminated to a second material and subsequently separate therefrom. The method includes preheating a mold, the mold having a cavity shaped to generally conform to the shape of the workpiece. A hole is then formed in the first material of the workpiece proximate an area to be repaired so as to expose the second material. Then, adhesive is injected through the hole, thereby placing adhesive between the first and second materials. A mold is then placed over the area to be repaired and pressure is applied to the mold, thereby reforming the deformed area of the first material by heat, pressure and time.

The present invention is also a method for repairing a cracked workpiece. The method includes placing the mold over the area to be repaired. The mold has a cavity generally conforming to the shape of the workpiece and an auxiliary cavity proximate the area to be repaired. Pressure is then applied to the mold and thereby the workpiece. A patching adhesive is then injected into the auxiliary cavity of the mold, whereby a patch is formed over the area to be repaired. The mold is then removed.

The present invention is also a method for repairing a cracked laminated workpiece, the workpiece having a first material laminated to a second material and subsequently separated therefrom. The method includes preheating a mold, the mold having a cavity shaped to generally conform to the shape of the workpiece. A hole is then formed in the first material of the workpiece proximate an area to be repaired so as to expose the second material. Then, adhesive is injected through the hole, thereby placing adhesive between the first and second materials. A mold is then placed over the area to be repaired and pressure is applied to the mold, thereby reforming the deformed area of the first material by heat, pressure and time. The method includes placing the mold over the area to be repaired. The mold has a cavity generally conforming to the shape of the workpiece and an auxiliary cavity proximate the area to be repaired. Pressure is then applied to the mold and thereby the workpiece. A patching adhesive is then injected into the auxiliary cavity of the mold, whereby a patch is formed over the area to be repaired. The mold is then removed.

BRIEF DESCRIPTION OF THE DRAWINGS

FIG. 5 is a perspective view of one stage of the repair process on a window unit in accordance with the present invention;

FIG. 6 is a perspective view of another stage of the repair process of a window unit in accordance with the present invention;

FIG. 7 is a perspective view of another stage of the repair process of a window unit in accordance with the present invention;

FIG. 8 is a perspective view of still another stage of the repair process of a window unit in accordance with the present invention;

FIG. 9 is a top plan view of masking tape cut-outs utilized in the repair process as shown in the repair process of FIG. 8; and FIG. 10 is a front perspective view of a second mold utilized in accordance with the present invention.

DETAILED DESCRIPTION OF THE PREFERRED EMBODIMENT

Figure 1:
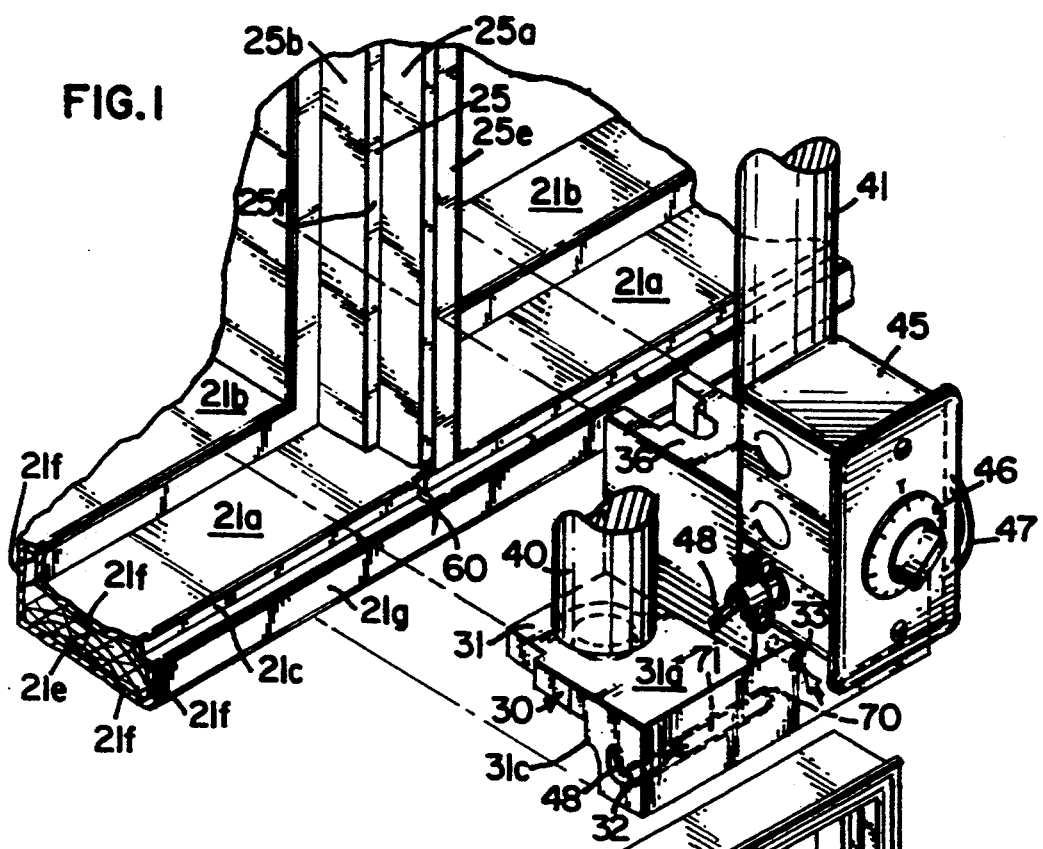
FIG. 1 is an enlarged, exploded perspective view of the mold and a portion of a window unit in accordance with the present invention.

Referring to the drawings, wherein like numerals represent like parts throughout the several views, there is generally disclosed at 10 a repair assembly. The repair assembly 10 is shown, in FIGS. 1 and 2, for use with repairing a window unit 20. However, it is understood the assembly apparatus may be used to repair other workpieces. Examples of a window that may be repaired are mullion and single corner windows made by Andersen Corporation, Bayport, Minn. The window unit 20 includes a sill 21, side members 22 and 23, and a top frame member 24, all operatively connected by means well known in the art to form a window unit. The window unit 20 has a mullion post 25 which is operatively connected between the top 24 and sill 21 to divide the window unit into two sections.

The mullion post 25 is symmetrical about a vertical plane. Accordingly, the left side, which is shown in FIG. 1, is the mirror image of the right side. The mullion post 25 has a first member 25a which is rectangular in cross-section and a second member 25b which also is rectangular in cross-section. The second member 25b is offset from the first member 25a and therefore, irregular outside perimeter of the mullion post is defined. Similar to the sill 21, which will be described more fully hereafter, the mullion post 25 has an inner core 25c and a vinyl covering 25d laminated thereto. The sill 21 has a first planar surface 21a and a second, elevated planar surface 21b. A third planar surface 21c is lower than the first planar surface 21a and a notch 21d is formed therein. The sill has a wooden core 21e to which a vinyl covering 21f is laminated.

Figure 3:
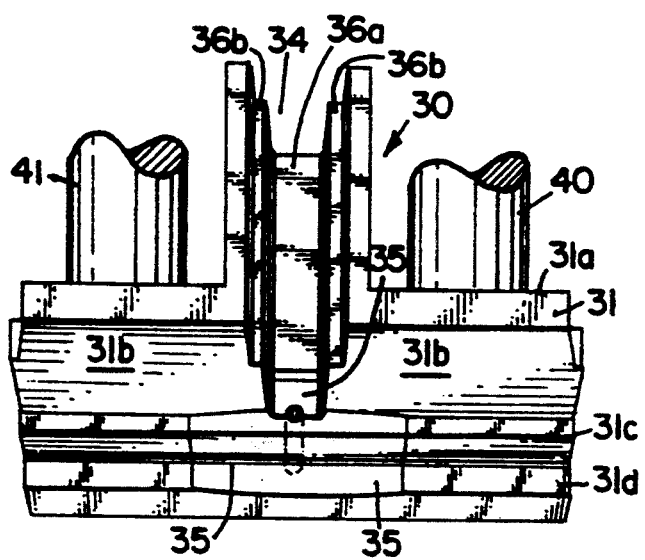
FIG. 3 is a front perspective view of the mold shown in FIG. 1.
Figure 4:
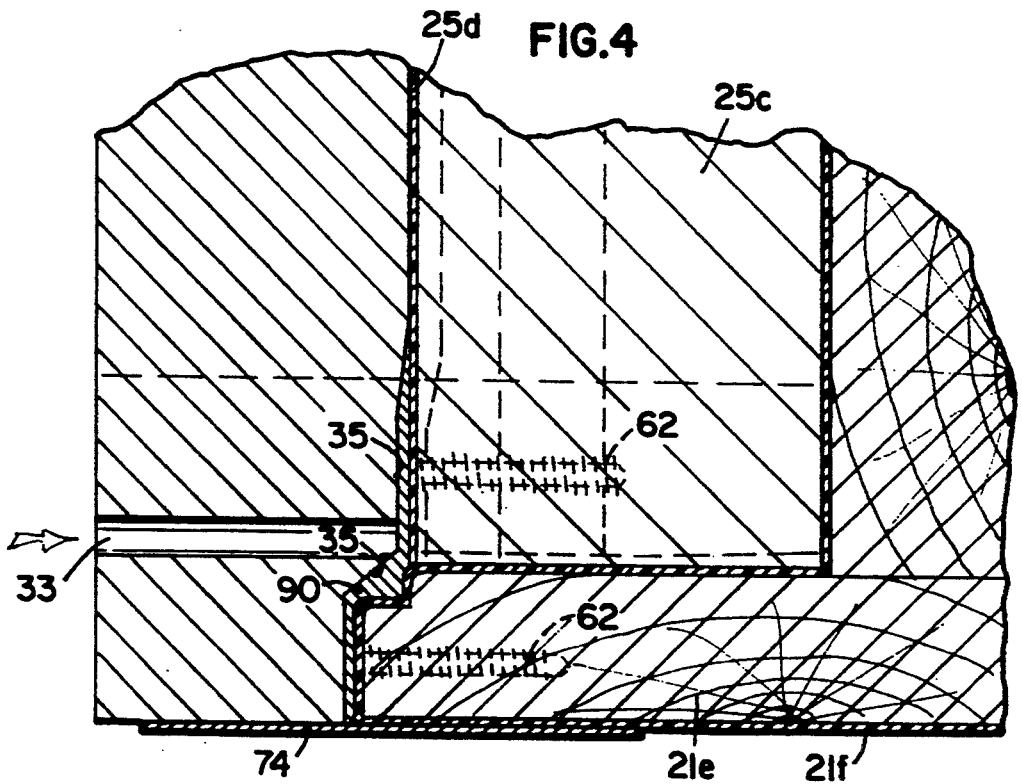
FIG. 4 is a cross-sectional view taken generally along the lines 4—4 of FIG. 2.

The repair assembly 10 includes a mold 30, as best shown in FIGS. 1, 3 and 4. The mold 30, which will be described in more detail hereafter, has a cavity 34 which has a shape which generally conforms to the shape of the article being repaired. Further, the mold 30 has an auxiliary cavity 35, which will be described in more detail hereafter. Two turnbuckle clamps 40 and 41 are operatively connected to a top plate 31 of the mold 30. The turnbuckle clamps are utilized for applying pressure to the mold 30 and the pressure is then transmitted to the window unit 20. The turnbuckle clamps 40 and 41 are identical and accordingly, only one will be described in detail. The turnbuckle clamp 40 includes a bottom half 40a having one section operatively connected to the top plate 31. A second section 40b is operatively connected to the first section 40a by means of a threaded shaft 40c. The shaft 40c has a knob 40d operatively connected thereto. The threaded shaft 40c rotates in threaded bores of both the first and second sections. By rotating the knob 40d, the shaft 40c rotates and the distance between the sections 40a and 40b are either increased or decreased, depending on the rotation of the knob 40d and thereby increasing or decreasing the overall length of the turnbuckle clamp 40.

A control box 45 is operatively connected to the mold 30 by any suitable means. The control box 45 has a control switch 46 which is connected to an electrical outlet by means of wire 47. A heating wire 48 is operatively connected to the control switch 46. The heating wire 48 is of course insulated when outside of the mold. The heating wire 48 continues inside of the mold 30 and enters by means of opening 32. A bore 70 extends inward from the opening 32. The heating wire 48 is operatively connected to a metal cartridge which is heated when electricity is applied. The metal cartridge 71 is positioned in the bore 70. It is understood other suitable means may also be employed to heat the mold to the desired temperature.

The mold 30 has a planar top plate 31. The top plate 31 has a top surface 31a and a bottom surface 31b. The bottom surface 31b is sized, shaped and configured to conform to the shape of the first planar surface 21a of the sill 21. The mold 30 has a cavity 34 which is configured to have a shape which would conform to the mullion post 25. The cavity 34 is formed in a block 36. The block 36 has a first inside planar surface 36a which, when inserted onto the mullion post 25, contacts surface 25e of the first member 25a. The block 36 has two second surfaces 36b which will each respectively come in contact with the surface 25f of the second member 25b. The top plate 31 has a downwardly depending flange 31c which is sized, shaped and configured to conform to the shape of the notch 21d. Finally, the top plate 31 has a generally perpendicular planar surface 31d which is shaped and configured to conform to the surface 21g of the sill 21.

As described so far, it can be seen that the mold 30 is designed to be placed on to the mullion post 25 and sill 21. The surface of the mold is shaped and configured to conform to the general shape of the workpiece which needs to be repaired. It is of course understood that if the shape of the mullion post 25 was different, the mold cavity 34 should have to be changed to conform to the shape of the new mullion post. Similarly, if the sill 21 was not planar, the bottom planar surface 31e would have to be changed to conform to the shape of the sill 21a.

In addition, the mold 30 has an auxiliary cavity 35 which is utilized in patching a crack in the vinyl or first layer of laminated material. While the other areas of the mold 30, previously described, were designed to come in contact with the workpiece (mullion 25 and sill 21) the auxiliary cavity 35 is spaced away from the workpiece so that there is room for a patch adhesive 90 to be inserted, and thereby build up the workpiece. Again, the size of the auxiliary cavity 35 will depend upon the amount of patching material 90 which the operator wishes to add to the workpiece (mullion post and sill). The auxiliary cavity 35 is an indentation further into the mold 30. The exact configuration of the indentation is best seen by viewing FIG. 8. FIG. 8 shows the build up of the patching material 90 which would correspond to the size and shape of the auxiliary cavity 35. Again, the exact size and shape would depend upon the amount of patching material 90 which the operator wishes to utilize. The passageway 33 has an opening which exits into the auxiliary cavity 35.

FIG. 10 discloses a mold 130 which is identical to the mold 30 with the exception that there is no auxiliary cavity 35. As will be discussed more fully hereafter, the mold 130 is best utilized for reforming and relaminating a delaminated layer. The surface of the mold is shaped and configured to conform to the general shape of the workpiece that needs repair. Similar to mold 30, the mold 130 has a planar top plate 131. The top plate 131 has a top surface 131a and a bottom surface 131b. The bottom surface 131b is sized, shaped and configured to conform to the shape of the first planar surface 21a of the sill 21. The mold 130 has a cavity 134 which is configured to have a shape which would conform to the mullion post 25. The cavity 134 is formed in a block 136. The block 136 has a first inside planar surface 136a which, when inserted on to the mullion post 25, contacts surface 25e of the first member 25a. The block 136 has two second surfaces 136b which will each respectively come in contact with the surface 25f of the second member 25b. The top plate 131 has a downwardly depending flange 131c which is sized, shaped and configured to conform to the shape of the notch 21d. Finally, the top plate 131 has a generally perpendicular planar surface 131d which is shaped and configured to conform to the surface 21g of the sill 21. It can be seen that the mold 130 is designed to be placed on to the mullion post 25 and sill 21. The surface of the mold is shaped and configured to conform to the general shape of the workpiece which needs to be repaired. It is of course understood that if the shape of the mullion post 25 was different, the mold cavity 134 should have to be changed to conform to the shape of the new mullion post. Similarly, if the sill 21 was not planar, the bottom surface 131e would have to be changed to conform to the shape of the sill 21a. Turnbuckle clamps 40 and 41 are operatively connected to the top plate 131, the same as with plate 131.

The following is the method for repairing a laminated window which has a minor crack at the mullion post. To begin with, the mold 130 is preheated. The exact temperature to which the mold will be heated will depend upon the material being treated. If the outer laminating material is vinyl, the temperature should not typically be hotter than 135° F. for this application. It is understood other temperatures would be used for other materials. If a window unit 20 is being repaired, it may be necessary to remove the stationary sash adjacent to the crack area in order to provide access to the repair area.

Figure 2:
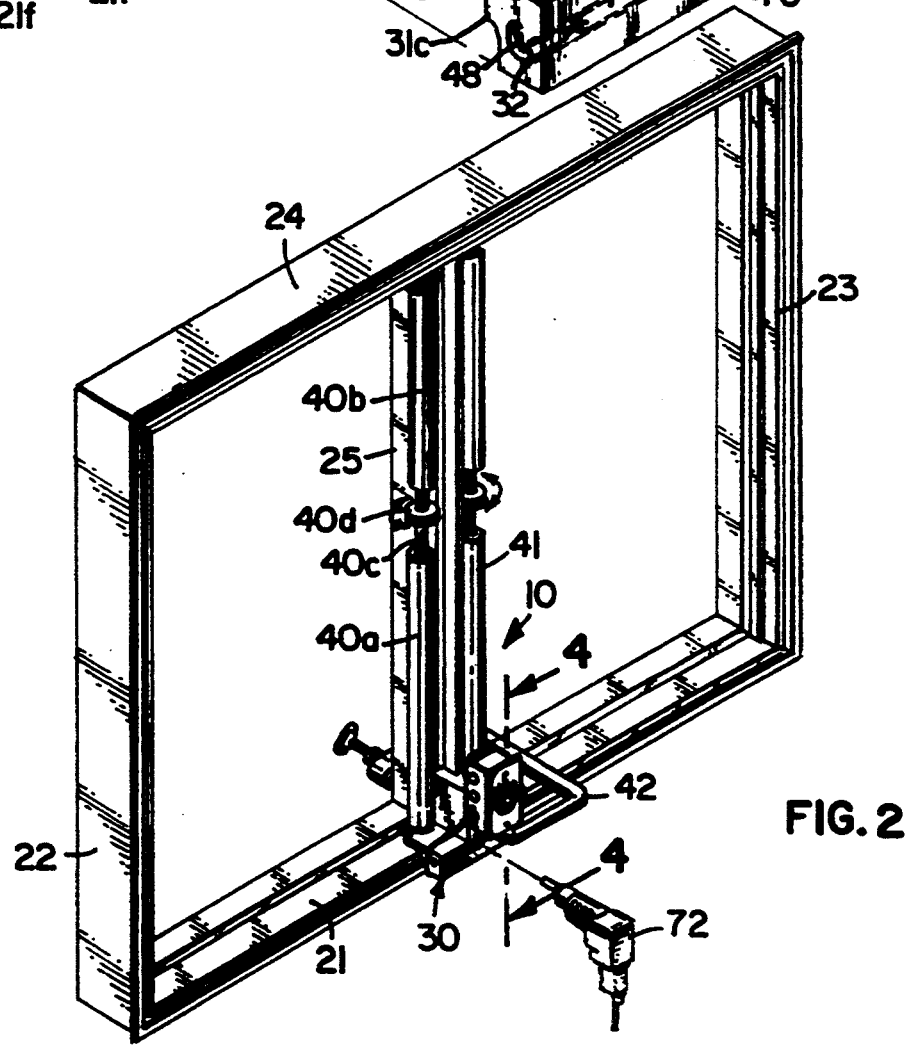
FIG. 2 is a perspective view of the mold shown in FIG. 1 being utilized to repair a window unit.

Frequently, when there has been a crack 60, the vinyl cover 21f will delaminate from the wooden core 21e. Also, the vinyl cover 21f may become deformed. Referring now to FIG. 5, two holes 61 are drilled in the mullion post 25. A suitable two component urethane adhesive, such as adhesive 7273/57/6693/74A from National Starch, is then injected into each of the holes 61 by suitable means such as injection gull 72. Then, the injection holes 61 are plugged with a suitable plug (not shown). The operator, using his fingers, then works the adhesive, that has just been injected, along the sill area to cause the adhesive to spread out between the cover 21f and the wooden core 21e. Then, using masking tape (not shown), the area to be repaired is covered prior to application of the preheated mold 130. The area to be repaired 80 is identified in FIG. 7 as the area not masked. The mold 130 is then placed over the mullion post 25 and sill 21 as shown in FIG. 2. The turnbuckle clamps 40 and 41 are adjusted to apply adequate pressure to the repair area. In addition, a C clamp 42 may be utilized, if necessary, to provide further pressure. This procedure described so far, will reform the deformed area, allowing for the patching procedure to be performed later. Further, the heated mold 130 will cause the adhesive to cure. The mold is left on from 5 to 10 minutes, depending upon the adhesive utilized and then removed. This is done by simply removing the C clamp 42 and loosening the turnbuckle clamps 40 and 41. The masking tape and any excessive adhesive is then removed by utilizing appropriate solvents, depending upon the adhesive used. Since there is no auxiliary cavity in the mold 130, the mold 130 contacts the area to be repaired and applies pressure to reform the repaired are 80 and also to relaminate the cover 21f to the wooden core 21e.

The area to be repaired is then roughed up by either sand paper or files to improve the adhesion of the patch material 90 which will later be applied. One should be careful not to scratch or braid any areas which will not be covered by the patch material. Now, referring to FIG. 6, three drywall screws 62 are driven into the mullion post to provide for a mechanical connection between the vinyl 21f and the wooden core 21e. This will prevent future movement of the vinyl 21f in the area.

Referring now to FIG. 9, three pre-cut tape sections 71, 72 and 73 are prepared. The tape is used to cover the area adjacent the repair area 80. Of course, the size of the tape sections will depend on the side of the repair area 80. In FIG. 7, the masking tape sections 71, 72 and 73 have been applied and the area defined by the masking tape 71, 72 and 73, or the repair area, is designated as 80. Duct tape 74 is applied underneath the sill 21, as shown in FIG. 4. Alternately, a metal plate may be inserted if the underside is not accessible. The mold 30 is then loosely placed on the mullion post 25 and the turnbuckle clamps 40 and 41 are adjusted to tighten the mold. Again, a C clamp 42 may be utilized to provide additional pressure. The duct tape 74 is then secured to the underside of the mold 30, as shown in FIG. 4. A suitable patch adhesive material 90 is then injected, by suitable means such as injection gun 72, through the passage way 33 as shown by the arrow in FIG. 4 into the auxiliary cavity 35. One suitable patch adhesive material would be TL 0271 from H. B. Fuller Company, St. Paul, Minn., but any other suitable adhesive material may be used. The amount of patch material inserted will be dependent upon the size of the auxiliary cavity 35 of the mold 30 which is not in contact with the workpiece. After a suitable amount of time, depending upon the patch adhesive 90, approximately 5 minutes, the mold 30, clamps 40, 41 and 42, duct tape 74 and masking tape 71–73 are removed. Of course other times for other materials and conditions may be necessary.

Referring now to FIG. 8, it can be seen that the patch material 90 creates a patch for covering the repair area 80. The patch adhesive 90 may now be buffed with a suitable tool such as a Scotchbrite pad. A Stanley knife may also be used for this procedure. Then, a suitable coating of paint may be applied to the patch adhesive 90 to match the rest of the sill area 21.

Then, the operating sash, which was previously open to begin this procedure, is closed. If there is contact with the patch adhesive 90, some of the excessive flash on the sash may be removed to prevent scratching the patch adhesive 90. Finally, the stationary sash is reinstalled, if necessary, and any finishing cosmetic touches may be completed.

Other modifications of the invention will be apparent to those skilled in the art in light of the foregoing description. This description is intended to provide specific examples of individual embodiments which clearly disclose the present invention. Accordingly, the invention is not limited to these embodiments or the use of elements having specific configurations and shapes as presented herein. All alternative modifications and variations of the present invention which follow in the spirit and broad scope of the appended claims are included.

I claim:

1. A method for repairing a cracked laminated portion of a window frame, the window frame having a first material laminated to a second material and separated therefrom, comprising:

(a) preheating a first mold, the first mold having a cavity shaped to generally conform to the shape of an area of the window frame to be repaired;

(b) forming a hole in the first material of the window frame proximate the area to be repaired so as to expose the second material;
(c) injecting an adhesive through said hole, thereby placing adhesive between the first and second material;
(d) placing the first mold over the area to be repaired;
(e) applying a pressure to the first mold, thereby reforming any deformed area of the first material by heat, pressure and time;
(f) removing the first mold;
(g) placing a second mold over the area to be repaired the second mold having a cavity generally conforming to the window frame and an auxiliary cavity proximate the area to be repaired;
(h) operatively connecting, by mechanical means, the first material to the second material proximate the area to be repaired;
(i) applying pressure to the second mold and thereby the window;
(j) injecting a patching adhesive to the auxiliary cavity of the second mold, wherein a patch is formed over the area to be repaired; and
(k) removing the second mold.

2. The method of claim 1, wherein the operatively connecting by mechanical means is connecting the first material to the second material by a screw.

3. A method for repairing a cracked laminated portion of a window frame, the window frame having a first material laminated to a second material and separated therefrom, comprising:
(a) preheating a first mold, the first mold having a cavity shaped to generally conform to the shape of an area of the window frame to be repaired;
(b) forming a hole in the first material of the window frame proximate the area to be repaired so as to expose the second material;
(c) injecting an adhesive through said hole, thereby placing adhesive between the first and second material;
(d) plugging the hole;
(e) pressing on the first material to move the adhesive between the first material and the second material;
(f) covering the area to be repaired;
(g) placing the first mold over the area to be repaired;
(h) applying pressure to the first mold, thereby reforming any deformed area of the first material by heat, pressure and time;
(i) removing the mold, covering and any excessive adhesive;
(j) operatively connecting, by mechanical means, the first material to the second material proximate the area to be repaired;
(k) masking the area to be repaired;
(l) placing a second mold over the area to be repaired the second mold having a cavity generally conforming to the window frame and an auxiliary cavity proximate the area to be repaired;
(m) applying pressure to the second mold and thereby applying pressure to the window frame;
(n) injecting a patching adhesive to the auxiliary cavity of the second mold, wherein a patch is formed over the area to be repaired;
(o) removing the second mold, making material and any patching material; and
(p) applying a finishing coat to the patch material to match the window frame.

4. The method of claim 3, wherein the operatively connecting by mechanical means is connecting the first material to the second material by a screw.

* * * * *